United States Patent Office 2,707,189
Patented Apr. 26, 1955

2,707,189

3-KETO-17β-ACETAMIDO-4-ANDROSTENE AND PROCESS

Maxton F. Murray, Kalamazoo Township, Kalamazoo County, Mich., assignor to The Upjohn Company, Kalamazoo, Mich., a corporation of Michigan No Drawing. Application September 11, 1952, Serial No. 309,141

3 Claims. (Cl. 260—397.3)

The present invention is concerned with 3-keto-17β-acetamido-4-androstene and with a process for its preparation. The following structural formula is representative of 3-keto-17β-acetamido-4-androstene:

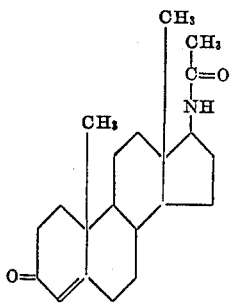

The process of the present invention involves a Beckmann rearrangement of progesterone-20-oxime, a compound which can readily be prepared from 5-pregnene-3β-ol-20-one as shown in Preparations 1 and 2.

An object of the present invention is to provide the novel 3-keto-17β-acetamido-4-androstene. Another object of the present invention is to provide a process for the production of 3-keto-17β-acetamido-4-androstene from progesterone-20-oxime by a Beckmann rearrangement reaction without the concomitant formation of undesirable substitution products produced by reactions of the α,β-unsaturated 3-keto group. Other objects of the present invention will be apparent to those skilled in the art to which this invention pertains.

It is well known that α,β-unsaturated ketones are highly reactive to various reagents forming 1,2 and 1,4 addition products. Phosphorus trichloride and phosphorus pentachloride, common reagents used in Beckmann rearrangement reactions, give various addition compounds with α,β-unsaturated ketones (summarized in "Organic Chemistry," 2nd edition, John Wiley and Sons, Inc., New York, N. Y. 1943, p. 680) under ordinary reaction conditions and this type of reaction has therefore been evaded by chemists. For this reason, steroid chemists have been confined to the starting materials containing only the oxime group of which the rearrangement was desired, and no 3-keto-Δ⁴-grouping. For example, Bockmuhl, U. S. Patent 2,212,363, anticipated this undesirable side reaction at the 3-keto-Δ⁴-grouping of such steroid oximes during a Beckmann rearrangement reaction and therefore avoided this grouping until after the treatment with Beckmann rearrangement reagent. Such procedure, however, necessitated a number of extra reactions before he could obtain his final products. The process of the present invention avoids such necessity.

The novel compound of the present invention has utility as a stable solid intermediate for the preparation of physiologically active compounds such as testosterone and 4-androstene-3,17-dione. For example, testosterone is obtained from 3-keto-17β-acetamido-4-androstene by acid hydrolysis followed by treatment with nitrous acid. Chromic acid oxidation of testosterone gives 4-androstene-3,17-dione.

The starting material of the present invention, progesterone-20-oxime, is a new compound which may be prepared by treatment of pregnenolone (5-pregnene-3β-ol-20-one) with hydroxylamine, followed by oxidation with aluminum isopropoxide, as shown in Preparations 1 and 2.

In carrying out the process of the present invention, progesterone-20-oxime is dissolved in a non-reactive solvent which is inert under the conditions of the reaction, such as pyridine, toluene or the like, and reacted upon by a specific catalyst used in Beckmann rearrangement reactions, namely, phosphorus oxychloride, at temperatures between minus twenty and plus 65 degrees centigrade. The mixture is then decomposed in ice water and the amido compound, 3-keto-17β-acetamido-4-androstene, is extracted from it, with a solvent, for example, chloroform.

By acid hydrolysis or preferably by hydrolysis with a base in high boiling solvents, e. g., sodium butylate in butyl alcohol 3-keto-17β-amino-4-androstene may be obtained which may then be utilized for the production of testosterone, and 4-androstene-3,17-dione.

The following preparations and example are given to illustrate the method of the present invention but are not to be construed as limiting.

PREPARATION 1.—5-PREGNENE-3β-OL-20-ONE, 20-OXIME

A solution of 13.90 grams (0.20 mole) of hydroxylamine hydrochloride and 30.36 grams (0.22 mole) of sodium acetate trihydrate in fifty milliliters of water was added, with stirring, over a period of five minutes, to a refluxing solution of 31.65 grams (0.10 mole) of 5-pregnene-3β-ol-20-one in 650 milliliters of methanol. The mixture was then refluxed for two hours, cooled, and 300 milliliters of water added thereto over a period of fifteen minutes. The mixture was filtered and the precipitate washed successively with fifty milliliters of fifty percent methanol and fifty milliliters of water. The product was dried at 45 degrees centigrade in a vacuum desiccator under reduced pressure until constant weight was obtained. The white crystalline 5-pregnene-3β-ol-20-one, 20-oxime thus obtained weighed 28.65 grams, a yield of 86.4 percent of theoretical, melting point 217-220 degrees centigrade.

A second crop of material was obtained from the filtrate by cooling, which increased the total yield to 93.4 percent.

PREPARATION 2.—PROGESTERONE-20-OXIME

A solution of 19.89 grams (0.06 mole) of 5-pregnene-3β,ol-20-one, 20-oxime in 1200 milliliters of toluene and 390 milliliters of cyclohexanone was heated, with stirring, to the boiling point and 120 milliliters of toluene removed by distillation in order to ensure elimination of all moisture. The solution was then cooled to approximately eighty degrees centigrade and 36.72 grams (0.18 mole) of aluminum isopropoxide added. The mixture was heated under total reflux, with stirring, for a period of twelve hours. After cooling, 500 milliliters of Rochelle salt (potassium sodium tartrate) was added and the mixture steam distilled until all the cyclohexanone had been removed. The mixture was cooled to room temperature and extracted with three 500-milliliter portions of methylene chloride. The combined organic extracts were washed with two 200-milliliter portions of water, dried over anhydrous sodium sulfate and filtered. Methylene chloride was removed by distillation and the residue dissolved in 500 milliliters of benzene. The benzene solution was concentrated to 200 milliliters and cooled to a temperature of five to ten degrees centigrade for three hours. After filtering and washing with fifty milliliters of cold benzene, the product was dried to constant weight under diminished pressure at 45 degrees centigrade. The resulting white crystalline compound weighed 6.65 grams, a yield of 33.1 percent. The melting point was 217–220 degrees centigrade.

*Analysis.*—Percent of nitrogen calculated for $C_{21}H_{31}NO_2$: 4.23. Found: 4.33.

Two more crops of progesterone-20-oxime crystals were obtained from the filtrate by removing all the benzene through distillation and slurrying the residue several times with small amounts of methanol and then isopropyl ether. The total yield of progesterone-20-oxime was thus raised to 62.3 percent. This was used as starting material in Example 1.

*Example 1.—3-keto-17β-acetamido-4-androstene*

To a solution of one gram (3.04 mole millimole) of progesterone-20-oximine in twelve milliliters of freshly-distilled pyridine was added drop-wise two milliliters of freshly-distilled phosphorus oxychloride over a period of fifteen minutes, while the temperature of the mixture was kept at zero degrees centigrade. The mixture was stirred for one hour at zero to five degrees centigrade and refrigerated overnight at minus ten degrees centigrade. The cooled mixture was then poured onto crushed ice containing hydrochloric acid. The clear aqueous acid solution was extracted repeatedly with fifty-milliliter portions of chloroform. The combined organic extracts were washed successively with 25 milliliters of five percent hydrochloric acid, 25 milliliters of water, and 25 milliliters of five percent sodium bicarbonate solution. After drying the chloroform extract over anhydrous sodium sulfate and filtering, the chloroform was removed by distillation to yield 0.87 gram (87 percent) of white crystalline 3-keto-17β - acetamido - 4 - androstene which, when recrystallized from 65 percent ethyl alcohol, had a melting point of 284–286 degrees centigrade.

*Analysis.*—Percent of nitrogen calculated for $C_{21}H_{31}NO_2$: 4.23. Found: 4.31.

Infrared analysis confirmed the structure of the compound.

It is to be understood that the invention is not to be limited to the exact details or exact compounds shown and described, as obvious modifications and equivalents will be apparent to one skilled in the art, and the invention is therefore to be limited only by the scope of the appended claims.

I claim:

1. A process for the production of 3-keto-17β-acetamido-4-androstene which consists in subjecting progesterone-20-oxime to a Beckmann rearrangement reaction to convert the progesterone-20-oxime to 3-keto-17β-acetamido-4-androstene, using as catalyst phosphorus oxychloride.

2. A process for the production of 3-keto-17β-acetamido-4-androstene which consists in subjecting progesterone-20-oxime to a Beckmann rearrangement reaction to convert the progesterone-20-oxime to 3-keto-17β-acetamido-4-androstene, the arrangement reaction being conducted at a temperature between about minus twenty and about plus 65 degrees centigrade, using as catalyst phosphorus oxychloride.

3. 3-keto-17β-acetamido-4-androstene.

References Cited in the file of this patent

UNITED STATES PATENTS

| | | |
|---|---|---|
| 2,188,870 | Bockmuhl | Jan. 30, 1940 |
| 2,212,363 | Bockmuhl | Aug. 20, 1940 |
| 2,254,562 | Bockmuhl | Sept. 2, 1941 |
| 2,531,441 | Julian | Nov. 28, 1950 |